United States Patent [19]

Dessouky

[11] Patent Number: 5,040,277

[45] Date of Patent: Aug. 20, 1991

[54] COMBINED INSTALLATION AND SWAGING TOOL

[75] Inventor: Ahmed E. Dessouky, Paramount, Calif.

[73] Assignee: Deutsch Al, Santa Monica, Calif.

[21] Appl. No.: 453,392

[22] Filed: Dec. 18, 1989

[51] Int. Cl.[5] .............................................. B23P 19/04

[52] U.S. Cl. .................................. 29/240; 29/243.52; 29/243.58; 72/112; 81/53.2

[58] Field of Search ............................ 81/53.2, 52, 54; 29/240, 243.5, 243.52, 243.58; 72/114, 112, 391, 453.17

[56] References Cited

U.S. PATENT DOCUMENTS

| | | |
|---|---|---|
| 2,855,661 | 10/1958 | Forster . |
| 3,137,186 | 6/1964 | Rosan et al. . |
| 3,245,137 | 4/1966 | Neuschotz et al. . |
| 3,322,005 | 5/1967 | Neuschotz . |
| 3,388,621 | 6/1968 | Neuschotz . |
| 3,446,101 | 5/1969 | McKay . |
| 3,481,022 | 12/1969 | Neuschotz . |
| 4,361,943 | 12/1982 | Kobusch . |
| 4,528,737 | 7/1985 | Cosenza et al. . |
| 4,562,755 | 1/1986 | Reece . |
| 4,752,996 | 6/1988 | Berecz et al. . |
| 4,914,933 | 4/1990 | Schepergerdes . |

OTHER PUBLICATIONS

Rosan, Inc. brochures for Slimsert One Piece Locked-In Inserts, 7 pages (various dates).

*Primary Examiner*—D. S. Meislin
*Attorney, Agent, or Firm*—Pretty, Schroeder, Brueggemann & Clark

[57] ABSTRACT

An installation tool is disclosed for installing an insert in a workpiece to the correct depth and swaging it in a single operation. The tool includes a mandrel having an externally threaded shaft at its outer end for engaging the insert. The mandrel is rotated to install the insert in the workpiece to the correct depth by a motor having an output shaft connected to the mandrel by a first clutch assembly. After the insert has been installed to the correct depth, the mandrel stops rotating and the first clutch assembly disengages. A second clutch assembly then engages with the output shaft causing a swaging element to advance outwardly from the tool to swage the insert in the workpiece. When the swaging operation has been completed, the motor reverses direction and withdraws from the workpiece.

18 Claims, 4 Drawing Sheets

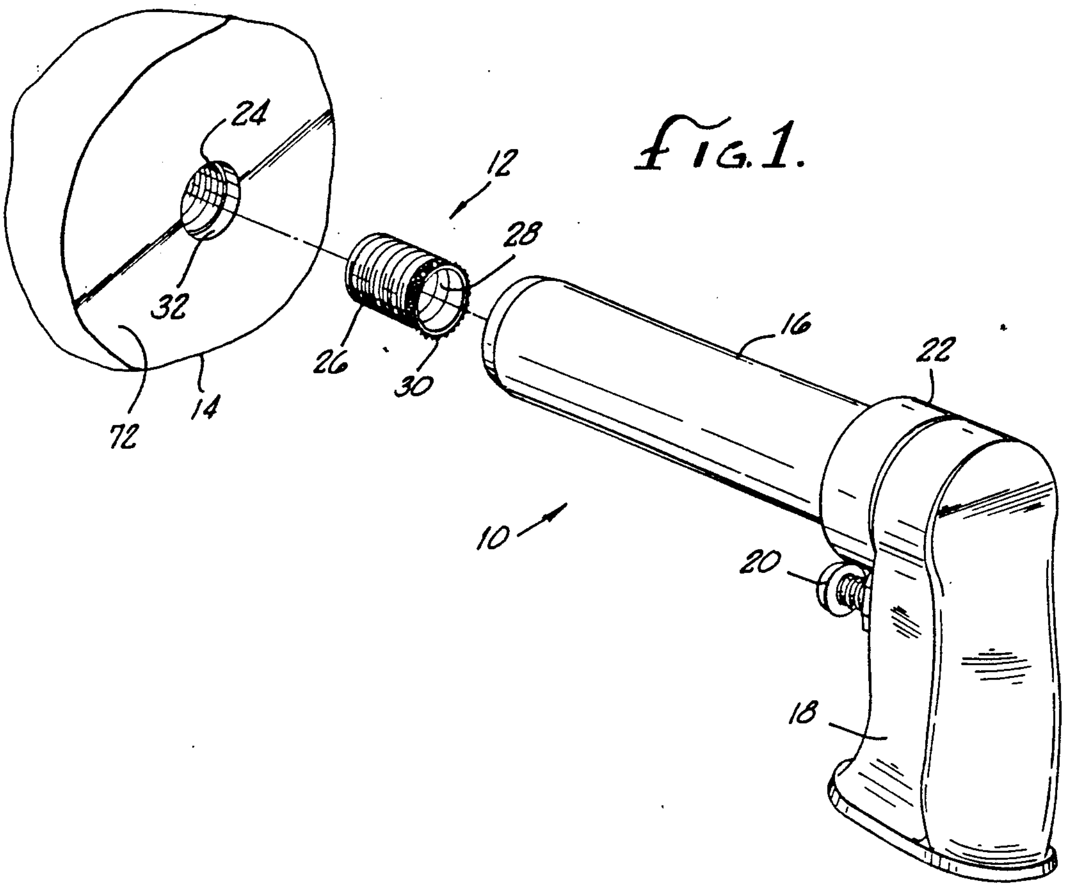
FIG. 1.
FIG. 7.
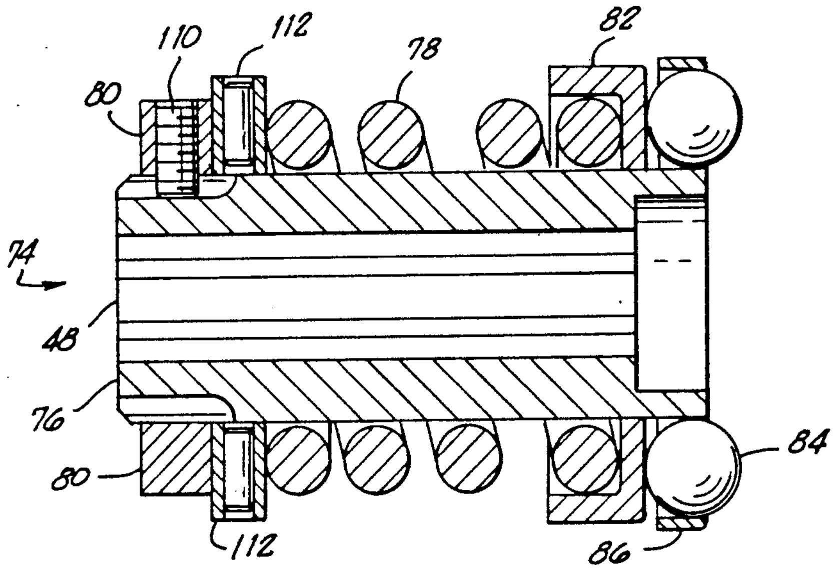

COMBINED INSTALLATION AND SWAGING TOOL

BACKGROUND OF THE INVENTION

The present invention relates to installation and swaging tools and, more particularly, to a tool adapted to rotatably install a threaded insert to the correct depth and swage it in a workpiece in a single operation.

Oftentimes, it is necessary to install a fastener, such as an externally threaded bolt, in a workpiece that is made of aluminum or a composite material that is relatively soft by comparison to the material of the fastener However, installation of the fastener directly into the workpiece generally is not advisable, because the fastener is prone to being undesirably loosened or pulled out of the workpiece under the action of axial or perpendicular loads on the fastener. Under these circumstances, it is commonly known to install a steel insert or secondary fastener in the workpiece to receive the primary fastener Properly installed inserts are designed to securely hold the primary fastener in the workpiece under loads that would ordinarily cause the threads of the fastener to be stripped or pulled out of the softer parent material of the workpiece.

Inserts come in several different shapes and sizes, depending upon the nature of the work involved. One type of insert for which the installation tool of the present invention has application comprises a cylindrical body having an outer surface with external threads adapted for threaded reception within a threaded hole in the workpiece. The inner surface of the insert has internal threads adapted for threaded reception with the externally threaded primary fastener. To insure that the insert is securely connected to the workpiece, the insert has a plurality of serrations or barbs circumferentially arranged on the external surface of the insert at its outer end. After the insert is fully threaded into the workpiece hole to the correct depth, the barbs are swaged into a counterbore in the hole to securely connect the insert to the workpiece. In most workpieces, the steel barbs of the insert will be pressed into a positive mechanical engagement with the softer parent material of the workpiece so that both axial and rotational movement of the insert is restrained. Thus, when the primary fastener is installed, it is less likely to be pulled from the workpiece during normal use conditions.

Over the years, various installation procedures have been developed for installing inserts in workpieces. One known procedure involves a two-step operation in which a drive wrench having a hexagonally shaped key at its outer end engages a matching hexagonal wrenching surface on the threaded inner surface of the insert. The wrench has a handle that is rotated manually until the insert is threadably installed in the workpiece hole to the correct depth. In many instances, it takes several trials to accurately install the insert to the correct depth. Thereafter, the drive wrench is removed from the insert and a swaging tool is applied to the insert to manually swage the barbs radially outwardly into the counterbore of the workpiece hole.

The manual installation procedure described above, while effective, has several fundamental disadvantages. Most notable is that two separate installation steps involving two separate installation tools are required to install and swage the insert. This two-step procedure is relatively time consuming and requires careful attention and skill by the operator to insure that the insert is properly installed and swaged. Failure by the operator to fully thread the insert into the workpiece to the correct depth with the first tool could prevent the barbs from being properly swaged into the counterbore of the workpiece hole in the second step of the installation process. Similarly, even if the insert is fully threaded into the hole to the correct depth by the first tool, carelessness by the operator during the swaging operation with the second tool could result in a defectively swaged insert.

To avoid the problems inherent with the manual installation procedure described above, attempts have been made to produce a power tool for installing the inserts. However, none of the known power tools have been successful in installing and swaging the insert in a single operation.

Accordingly, there has existed a definite need for a power installation tool that will quickly and properly install and swage an insert in a workpiece in a single step, without requiring undue skill or attention by the operator. The present invention satisfies this need and provides further related advantages.

SUMMARY OF THE INVENTION

The present invention is embodied in an installation tool that is capable of installing an insert to the correct depth and then swaging it in a workpiece in a single operation. The installation tool includes a tool housing defining a hollow cylinder and a mandrel rotatably retained within the cylinder. The mandrel also has means for engaging the insert Rotation of the mandrel, and thus the insert, is accomplished by a motor having an output shaft that is connected to the mandrel by a first clutch assembly. After the mandrel has fully installed the insert to the correct depth in the workpiece, a second clutch assembly is moved into engagement with the output shaft of the motor and the first clutch assembly disengages. This causes a swaging element of the tool to swage the insert in the workpiece. Thus, the tool enables an operator to quickly and properly install an insert to the correct depth and then swage it in a single step, without requiring undue skill or attention.

More particularly, the first clutch assembly comprises a clutch housing having an inner end connected to the output shaft for rotation therewith. The outer end of the clutch housing rotatably receives the inner end of a spline shaft in the cylinder, but the spline shaft is not rotated with the clutch housing upon rotation of the output shaft. The first clutch assembly further includes a spring that biases a first ball at one end of the spring radially outwardly into positive engagement with a notch in a sleeve forming part of the mandrel. The spring simultaneously biases a second ball at the other end of the spring radially inwardly into rolling engagement with the inner end of the spline shaft. Thus, rotation of the output shaft by the motor causes rotation of the mandrel through the first clutch assembly to rotatably install the insert in the workpiece.

After the insert has been installed to the correct depth, a plurality of pins will have moved inwardly through the cylinder causing the second clutch assembly to engage the output shaft. The second clutch assembly includes a clutch housing keyed for rotation with an intermediate portion of the spline shaft. A spring around the clutch housing inwardly biases a plurality of balls retained in a cage at the inner end of the clutch housing. At the point where the insert is installed in the workpiece to the correct depth, the pins will have moved the clutch housing inwardly a sufficient distance so that the balls of the second clutch assembly engage notches in a clutch plate connected for rotation with the spline shaft. When the second clutch assembly is not engaged, the balls and cage are biased away from the clutch plate by a spring interposed between them around the spline shaft.

After the insert is installed to the correct depth in the workpiece, a spring biased nose extending outwardly from the tool housing will have reached its full range of axial travel and cause the mandrel to stop rotating. As a result, the first clutch assembly will overrun, and the second clutch assembly and spline shaft will rotate together as a unit relative to the stationary mandrel. Further, since the outer end of the spline shaft is threadably connected to the mandrel, the spline shaft will advance outwardly within the mandrel and thus through the tool. This outward movement of the spline shaft results in corresponding movement of a plurality of pins within the cylinder that, in turn, move the swaging element outwardly to swage the insert in the workpiece. This outward movement of the spline shaft will also bring an annular recess on the inner end of the spline shaft into registration with the second ball to disengage the first clutch assembly.

Once the insert has been swaged, the motor reverses the rotational direction of the output shaft Since the first clutch assembly is still disengaged, the spline shaft will retract inwardly within the tool. This disengages the second clutch and re-engages the first clutch to rotate the mandrel and withdraw it from the insert Thereafter, the tool may be used with a new insert to be installed.

In one aspect of the invention, the means on the mandrel for engaging the insert comprises an externally threaded surface on a shaft comprising the outer end of the mandrel. The swaging element preferably comprises a split bushing surrounding the mandrel shaft at a location just inwardly from the shaft's threaded surface. With this arrangement, the swaging element may quickly move into position to perform its swaging function immediately after the mandrel has rotatably installed the insert to the correct depth in the workpiece.

In another aspect of the invention, the pins within the mandrel that move the swaging element can be varied in their axial length to accommodate different swaging depths for various sized inserts. In still another aspect of the invention, the swaging force that is applied to the insert can be adjusted by varying the compression of the spring surrounding the clutch housing of the second clutch assembly. In this regard, the spring is biased between an adjustable nut threadably connected to the outer end of the clutch housing and a retainer ring connected to the inner end of the clutch housing that abuts the ball retaining cage to bias it inwardly. The nut is secured at a desired location to the clutch housing by a set screw. Adjusting the compression of the spring changes its length and, hence, the amount of swaging force that is applied to the insert by the swaging element.

In still another aspect of the invention, the spring biased nose at the outer end of the tool housing can be varied in axial length as desired to change the depth of insertion of the insert into the workpiece, prior to swaging, when different size inserts are involved.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a combined installation and swaging tool embodying the novel features of the invention and illustrated in position to install a fastener or insert into the threaded hole of a workpiece;

FIG. 7 is an enlarged cross-sectional view of the second clutch assembly of the tool.

DETAILED DESCRIPTION OF THE PREFERRED EMBODIMENT

Figure 2:
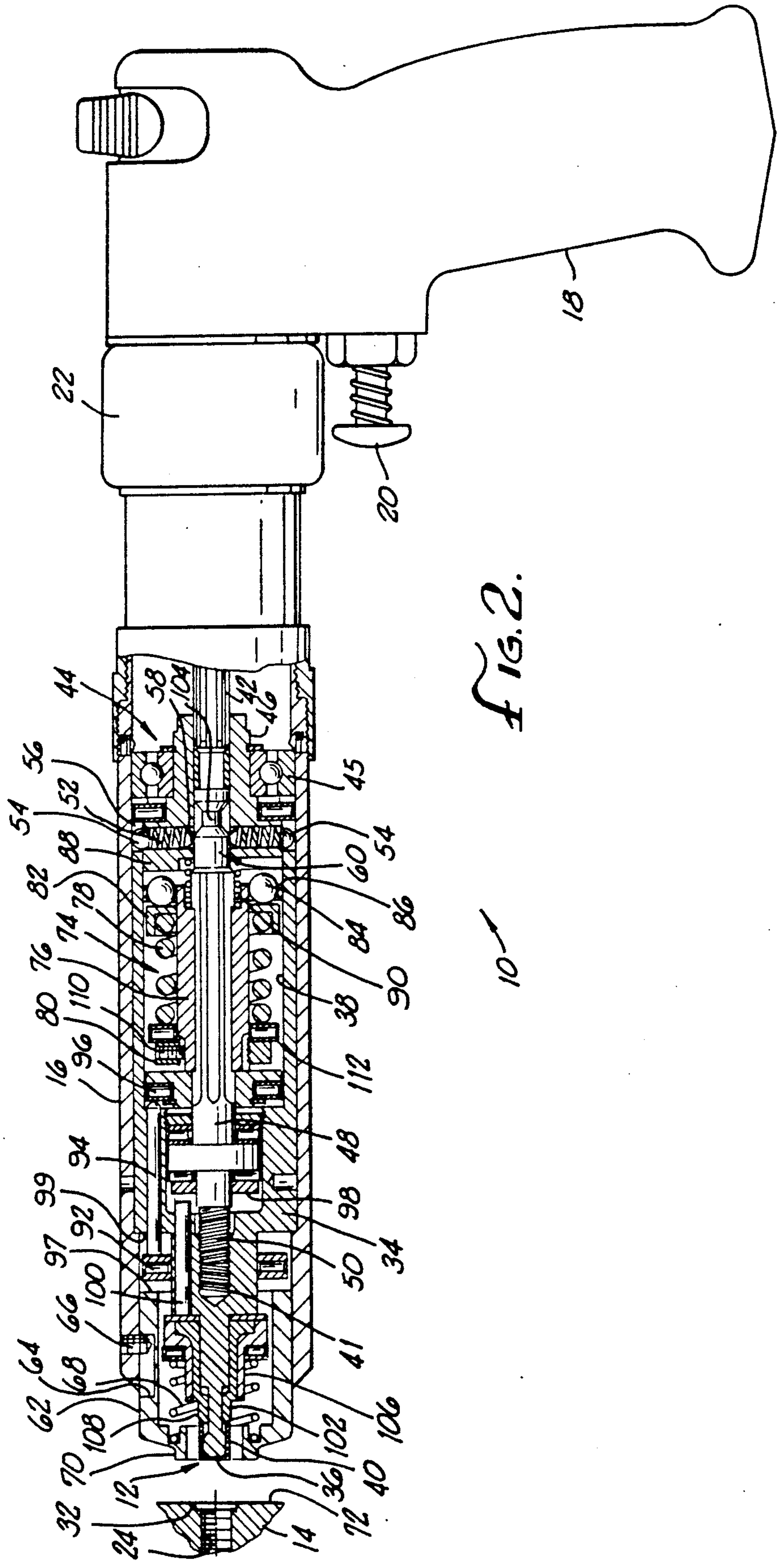
FIG. 2 is an enlarged, fragmentary cross-sectional longitudinal view of the tool prior to installation of the insert into the workpiece hole.

As shown in the accompanying drawings, and particularly in FIG. 1, the present invention is embodied in an installation tool, indicated generally by the reference numeral 10, for use in installing a fastener or insert 12 to the correct depth and swaging it in a workpiece 14. The installation tool 10 includes a cylindrical tool housing 16 with a handle 18 projecting perpendicularly from the housing's rear or inner end for manual grasping by the operator. A spring-biased trigger 20 is mounted on the handle 18 for selective use in operating the tool 10. The lower end of the handle 18 carries a fitting (not shown) suitable for connection to a source of pressurized air (also not shown). Actuation of the trigger 20 supplies pressurized air to operate an air motor 22 in the tool 10, as is conventional.

FIG. 1 shows the tool 10 in position prior to installing the insert 12 in a threaded hole 24 of the workpiece 14. The insert 12 comprises a cylindrical body having an outer surface with external threads 26 adapted for threaded reception within the threaded workpiece hole 24. The inner surface of the insert 12 has internal threads 28 adapted for threaded reception with an externally threaded primary fastener or other device (not shown) to be connected to the workpiece 14 by the insert To insure that the insert 12 is securely connected to the workpiece 14, the insert has a plurality of serrations or barbs 30 circumferentially arranged on the external surface of the insert 12 at its outer end. After the insert 12 is threaded into the workpiece hole 24 to the correct depth in the first step of the installation process, the barbs 30 are thereafter swaged into a counterbore 32 in the hole to securely connect the insert to the workpiece 14. In this way, the primary fastener is less likely to be loosened or pulled from the workpiece 14 during normal use conditions.

While an externally and internally threaded cylindrical insert 12 has been illustrated and described, it will be appreciated that inserts and fasteners of other shapes and dimensions may be used in connection with the installation tool 10 of the present invention. It also will be appreciated that the tool 10 can be used to install fasteners or inserts in various types of structures besides the workpiece 14 illustrated in the drawings. Therefore, it should be understood that the insert 12 illustrated in the drawings is not intended to limit the scope of the present invention.

Figure 3:
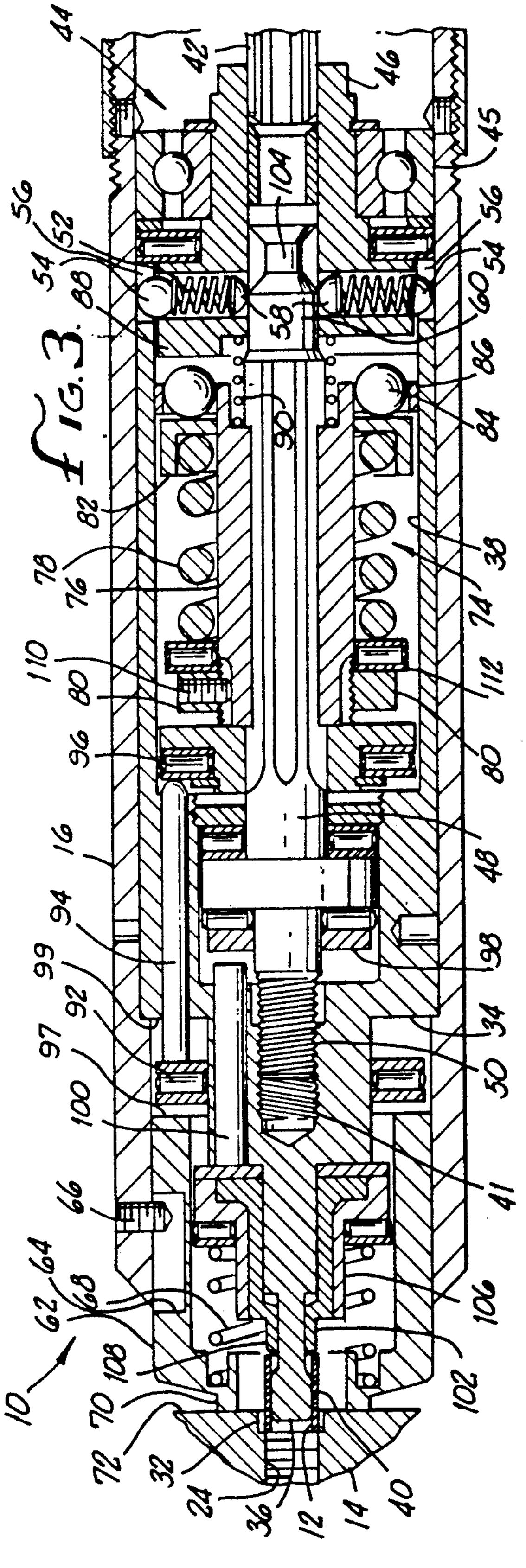
FIG. 3 is a further enlarged cross-sectional view of the tool, similar to FIG. 2, showing the insert partially installed in the workpiece.

Referring now to FIGS. 2-6 and particularly to FIG. 3, the tool 10 includes an elongated mandrel 34 having a substantially cylindrical shaft 36 at its outer end and a hollow sleeve 38 at its inner end. The shaft 36 has an externally threaded surface 40 for threaded reception with the internal threads 28 of the insert 12. The mandrel 34 further includes a threaded bore 41 opposite the shaft 36 that faces inwardly toward the open end of the mandrel 34 sleeve 38. As shown in the drawings, the mandrel sleeve 38 fits concentrically within the tool housing 16.

Rotation of the mandrel 34 within the tool housing 16, to install the insert 12 to the correct depth in the workpiece 14, is provided by the air motor 22 previously described. In the preferred embodiment, the motor 22 is capable of producing an output of approximately 450-650 rpm. The motor 22 includes an output shaft 42 that selectively rotates the mandrel 34 through a first clutch assembly 44.

The first clutch assembly 44 is supported in the tool housing 16 by bearings 45 and comprises a clutch housing 46 having its inner end keyed for rotation with the output shaft 42 by a spline drive arrangement. The outer end of the clutch housing 46 rotatably receives a spline shaft 48 extending within the tool housing 16 and, particularly, within the sleeve 38 of the mandrel 34. The spline shaft 48, which will be described in more detail below, also includes a threaded outer end 50 that is received within the threaded bore 41 of the mandrel 34. The first clutch assembly 44 further includes a plurality of clutch springs 52 within the clutch housing 46. Each of these springs 52 has a ball at its outer end designed to transfer rotation of the output shaft 42 to the mandrel 34. More particularly, a first ball 54 is biased radially outwardly by the clutch spring 52 into engagement with a ball receiving notch 56 on the mandrel sleeve 38. A second ball 58 is biased radially inwardly by the clutch spring 52 into rolling engagement with a cylindrical surface 60 on the spline shaft 48. This enables rotation of the output shaft 42 to be transferred to the mandrel 34 by the first clutch assembly 44.

The outer end of the tool housing 16 is provided with a tapered nose 62. The inner end of the nose 62 is retained within the tool housing 16 by an elongated slot 64 on the external surface of the nose. A screw 66 in the housing 16 fits within the slot 64 and allows the nose 62 to move a limited distance axially with respect to the housing. Prior to the installation process, as illustrated in FIG. 2, the nose 62 is normally biased outwardly away from the housing 16 by a nose spring 68. Spring biasing of the nose 62 in this manner facilitates alignment of the insert 12 within the workpiece hole 24 by the operator.

More particularly, in this regard, it will be noted that the outer end of the externally threaded mandrel shaft 36, and the insert 12 when it is threadably connected to the mandrel shaft prior to insertion into the workpiece 14, are positioned just slightly behind the outer end of the nose 62. Thus, when the operator applies the tool 10 to the workpiece 14, the outer surface of the nose 62 in the form of a raised ring 70 will abut and align itself flush against the workpiece surface 72 surrounding the workpiece hole 24. However, the insert 12 will not yet touch the workpiece hole 24. If the insert 12 were to project outwardly beyond the nose 62 prior to installation, it may cause the insert to be at an angle with respect to the hole and, therefore, misaligned. With the insert 12 positioned just slightly behind the nose 62, however, the ring 70 can be flattened against the workpiece surface 72 to achieve proper axial alignment. Thereafter, the tool housing 16 can be manually moved inwardly with respect to the nose 62 to align the insert 12 within the counterbore 32 of the workpiece hole 24. Once proper alignment has been achieved, as shown in FIG. 3, the trigger 20 may be depressed to cause rotation of the mandrel 34 by the first clutch assembly 44 in the manner described above. This installs the insert 12 to the correct depth in the workpiece hole 24, as shown in FIG. 4.

The installation tool 10 also includes a second clutch assembly 74 located within the hollow sleeve 38 of the mandrel 34. The second clutch assembly 74 comprises a clutch housing 76 keyed for rotation to an intermediate portion of the spline shaft 48. A clutch spring 78 surrounds the clutch housing 76 and is compressed between an adjustable nut 80 connected to the outer end of the clutch housing and a retainer ring 82 slidably connected to the inner end of the clutch housing. A plurality of balls 84 retained in a cage 86 at the inner end of the clutch housing 76 are biased inwardly by the spring 78 toward a clutch plate 88 connected for rotation with the output shaft 42. This clutch plate 88 preferably is integrally formed with the clutch housing 46 which is keyed for rotation with the output shaft 42, as noted above. During the process of installing the insert 12 in the workpiece 14 to the correct depth, the second clutch assembly 74 is not engaged and rotates as a unit with the mandrel 34 and spline shaft 48 to which it is attached. In this regard, it is noted that rotation of the mandrel 34 is imparted to the spline shaft 48 from the threaded connection between the threaded outer end 50 of the spline shaft and the threaded mandrel bore 41. To prevent inadvertent engagement of the second clutch assembly 74, a spline spring 90 positioned around the spline shaft 48 biases the clutch housing 76 and balls 84 of the second clutch assembly 74 away from the clutch plate 88.

Figure 4:
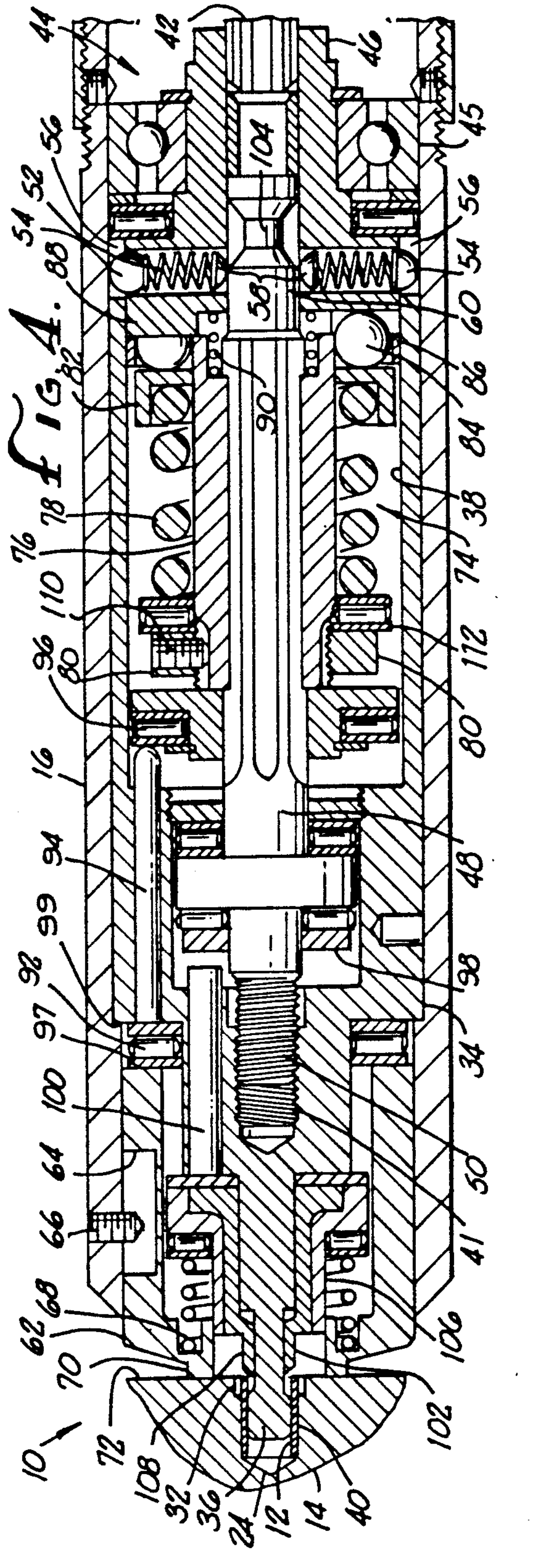
FIG. 4 is a cross-sectional view of the tool, similar to FIG. 3, showing the insert completely installed within the workpiece prior to swaging.

When the insert 12 is being installed in the workpiece 14 to the correct depth, the tool housing 16 will move outwardly toward the workpiece 14 and compress the nose spring 68, as the mandrel shaft 36 advances outwardly into the workpiece hole 24, as shown in FIGS. 3-4. As the tool housing 16 moves outwardly relative to the stationary nose 62, the end of the nose contacts a needle bearing 92 which, in turn, abuts against a plurality of pins 94 received through holes in the mandrel 34. In the preferred embodiment, three pins 94 are provided at circumferentially spaced locations. Outward movement of the tool housing 16 relative to the nose 62, therefore, moves the pins 94 inwardly through the tool housing during initial installation of the insert 12. This inward movement of the pins 94 is transferred to the second clutch assembly 74 through another needle bearing 96 riding on the spline shaft 48. Eventually, the rotating mandrel 34 will have installed the insert 12 in the workpiece 14 to the correct depth. This is shown in FIG. 4. At that point, the inward movement of the pins 94 will have advanced the second clutch assembly 74 inwardly and will have caused the balls 84 of the second clutch assembly to engage the clutch plate 88. Thus, the second clutch assembly 74 will now be engaged when the insert 12 is installed to the correct depth.

The depth of insertion of the insert 12 into the workpiece hole 24 is controlled by the nose 62. More particularly, the mandrel 34 will continue to rotate the insert 12 until the inner end 97 of the nose 62 has moved the needle bearing 92 into abutment against a shoulder 99 on the mandrel. The abutment between the needle bearing 92 and the shoulder 99 stops the outward travel of the tool housing 16 toward the workpiece 14 and prevents the insert 12 from being threaded any further into the workpiece hole 24. Consequently, the mandrel 34 stops rotating and causes the first clutch assembly 44 to overrun. Thus, it can be seen that the axial length of the nose 62 must be selected to determine the proper depth of insertion of the insert 12 into the workpiece hole 24.

Figures 5, 6:
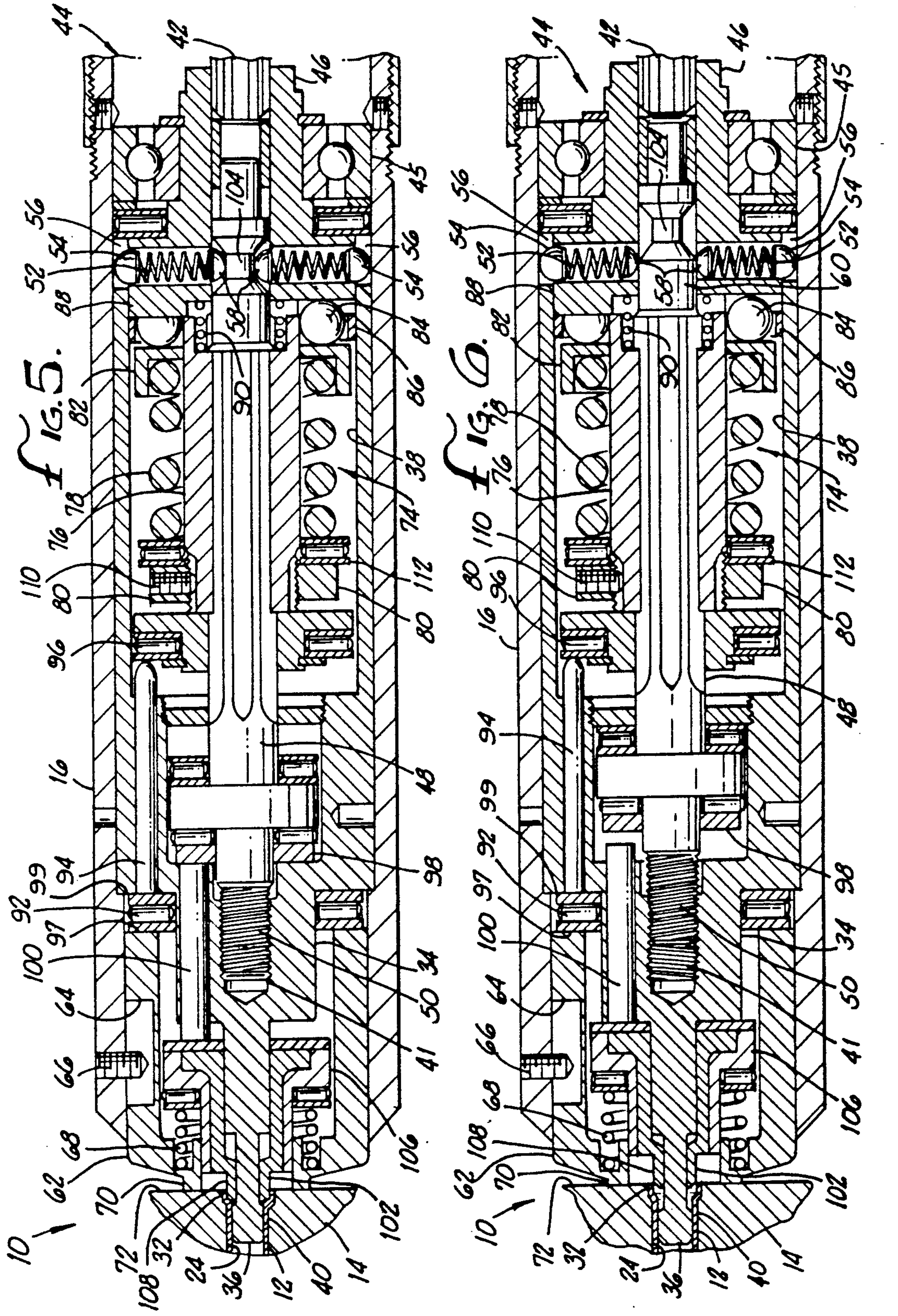
FIG. 5 is another cross-sectional view of the tool, similar to FIG. 3, showing the insert being completed swaged into a counterbore of the workpiece hole.
FIG. 6 is another cross-sectional view of the tool, similar to FIG. 3, showing the tool in the process of being withdrawn from the workpiece.

Although the mandrel 34 will have stopped rotating when the insert 12 is installed to the correct depth, the spline shaft 48 will continue to rotate, due to engagement of the second clutch assembly 74. In other words, the spline shaft 48 and second clutch assembly 74 will now rotate together as a unit relative to the stationary mandrel 34. In view of the threaded connection between the threaded outer end 50 of the spline shaft 48 and the threaded bore 41 of the mandrel 34, the rotating spline shaft 48 will advance into the bore 41 and outwardly with respect to the stationary mandrel 34. This causes a needle bearing 98 on the advancing spline shaft 48 to contact a plurality of pins 100 to move a swaging element 102 outwardly from the tool 10, as shown in FIGS. 4–5. In the preferred embodiment, there are three pins 100 which fit within holes spaced circumferentially around the mandrel 34. Outward movement of the spline shaft 48 also causes the second ball 58 of the first clutch assembly 44 to move into an annular recess 104 on the spline shaft. This is illustrated in FIG. 5 and results in complete disengagement of the first clutch assembly 44, as the second ball 58 is allowed to run freely in the recess 104.

The swaging element 102 preferably comprises a split bushing surrounding the mandrel shaft 36 at a location just inwardly from the shaft's threaded surface 40. In the preferred embodiment, the split bushing 102 has a hexagonal internal surface configuration that matches a hexagonal external surface configuration on the mandrel shaft 36 to prevent relative rotation between these two parts. The swaging element 102 is retained on the mandrel shaft 36 by a one-piece bushing 106 and includes a tapered outer nose 108 adapted to be wedged between the mandrel shaft 36 and the internal threads 28 of the insert 12. This is shown in FIG. 5. During swaging, the barbs 30 of the insert 12 will be pressed into a positive mechanical engagement with the softer parent material in the counterbore 32 of the workpiece 14 so that both axial and rotational movement of the insert is restrained. Thus, when the fastener is installed and swaged, it is less likely to be pulled from the workpiece 14 during normal use conditions. With the swaging element 102 positioned just behind the threaded mandrel shaft 36, the swaging element may quickly move into position to perform its swaging function immediately after the mandrel 34 has installed the insert 12 in the workpiece 14 to the correct depth.

Once the swaging operation has been completed, the operator manually reverses the motor 22 to reverse the rotational direction of the output shaft 42 so that the spline shaft 48 will also reverse its rotational direction and retract inwardly within the tool 10, as shown in FIG. 6. The spline shaft 48 will rotate in the reverse direction before any rotation of the mandrel 34 due to the previous engagement of the second clutch assembly 74 and the fact that the first clutch assembly 44 is still disengaged, with the second ball 58 spinning freely within the recess 104. The strong frictional engagement between the tapered swaging nose 108 and the insert 12 created after swaging also tends to prevent rotation of the mandrel 34, since the mandrel is keyed to the swaging element 102 by the hexagonal configurations previously described Accordingly, this structure insures that the components of the tool 10 will retract in the reverse order from which they were advanced during the installation process. Thus, as the spline shaft 48 retracts, the nose spring 68 starts to expand to its normal expanded position, pushing the pins 100 inwardly and withdrawing the swaging element 102 from the insert 12. Outward expansion of the nose 62 relative to the tool housing 16 also relieves pressure on the pins 94, which had previously caused the second clutch assembly 74 to engage. This allows the spline spring 90 surrounding the spline shaft 48 to move from the retracted state shown in FIG. 6 back to the expanded state shown in FIG. 3. In the process, the inwardly advancing spline shaft 48 also moves the second ball 58 out of the recess 104. Expansion of the spline spring 90 disengages the second clutch assembly 74 and allows the first clutch assembly 44 to re-engage and rotate the mandrel 34 and withdraw it from the insert 12. At this point, the installation and swaging of the insert 12 has been completed, and the tool 10 may thereafter be used with a new insert to be installed.

In one aspect of the invention, the pins 100 within the mandrel 34 that move the swaging element 102 can be varied in their axial length. By varying the axial length of the pins 100, the swaging element 102 will be advanced to different depths in the workpiece 14. For example, a longer pin 100 will force the swaging element 102 deeper into the workpiece 14 than a shorter pin. By varying the axial lengths of the pins 100, therefore, the tool 10 may accommodate for different swaging depths of various sized inserts.

In still another aspect of the invention, the swaging force that is applied to the insert 12 can be adjusted by varying the compression of the clutch spring 78 surrounding the clutch housing 76 of the second clutch assembly 74. As shown best in FIG. 7, the adjustable nut 80 is threadably connected to the outer end of the clutch housing 76 and secured at a desired location by a set screw 110. A needle bearing 112 is positioned between the adjustable nut 80 and the clutch spring 78 to prevent rotation of the spring upon rotation of the clutch housing 76. Adjusting the compression of the clutch spring 78 changes its length and, hence, the amount of force exerted by the spring. This in turn determines the amount of swaging force that is applied to the insert 12 by the swaging element 102. In the preferred embodiment, the amount of swaging force to be applied by the swaging element 102 can be varied from 0–3,500 lbs. In use, a swaging force of approximately 2,500 lbs. has been found to be satisfactory.

In yet another form of the invention, the tapered nose 62 can be varied in axial length as desired to control the depth of insertion of the insert 12 into the workpiece 14 prior to the swaging operation. Thus, different sized noses can be conveniently interchanged by loosening the screw 66 in the tool housing 16 to permit removal of one nose for replacement by another. For example, a longer nose 62 will install the insert 12 to a more shallow depth in the workpiece hole 24 than a shorter nose. This feature of the tool 10 also is significant since it will allow accurate insertion of various sized inserts to the correct depth.

From the foregoing, it will be appreciated that the installation tool 10 of this invention provides quick and accurate installation and swaging of an insert 12 in a workpiece 14 in a single step, without requiring undue skill or attention by the operator. In the first step of the installation process, the tool 10 is configured to properly align the insert 12 with the workpiece hole 24 and to install it to the correct depth. In the second step of the installation procedure, the swaging element 102 advances outwardly to swage the insert 12 in the counterbore 32 of the workpiece 14. The tool 10 then withdraws itself from the workpiece 14 for use with another insert.

While a particular form of the invention has been illustrated and described, it will be apparent that various modifications can be made without departing from the spirit and scope of the invention. Accordingly, it is not intended that the invention be limited, except as by the appended claims.

I claim:

1. An installation tool for installing and swaging a fastener in a workpiece, comprising:

(a) a tool housing defining a hollow cylinder;

(b) a mandrel within the cylinder having means for engaging the fastener;

(c) a motor having an output shaft;

(d) a first clutch means movable between engaged and overrunning positions for releasably connecting the output shaft to the mandrel to thereby rotate the mandrel and install the fastener to a specific depth in the workpiece;

(e) a second clutch means movable between engaged and disengaged positions for releasably connecting the output shaft to a spline shaft;

(f) means for forcing the second clutch means into said engaged position and the first clutch means into said overrunning position when the fastener is installed to said specific depth in the workpiece;

(g) a swaging means for swaging the fastener in the workpiece; and (h) means connected to the spline shaft for moving the swaging means outwardly to swage the fastener when the first clutch means is in said overrunning position and the second clutch means is in said engaged position.

2. The installation tool of claim 1, wherein the means on the mandrel for engaging the fastener comprises an externally threaded surface on a shaft at the outer end of the mandrel.

3. The installation tool of claim 2, wherein said means for forcing includes a nose at the outer end of the tool housing that is axially slidably connected to the housing and biased outwardly therefrom by a nose spring, the nose having an opening through which the threaded surface of the mandrel shaft extends during the installation of the fastener.

4. The installation tool of claim 1, wherein said means for forcing includes a nose at the outer end of the tool housing that is axially slidably connected to the housing and biased outwardly therefrom by a nose spring, and means to axially limit the distance between the nose and the housing during installation of the fastener.

5. The installation tool of claim 4, wherein inward travel of the nose through the tool housing during installation of the fastener is limited by a shoulder on the mandrel, thereby limiting the depth of insertion of the fastener in the workpiece prior to swaging, and wherein the tool further comprises means to vary the axial length of the nose to selectively adjust the depth of insertion of the fastener in the workpiece.

6. The installation tool of claim 4, wherein the means for forcing further includes a plurality of pins slidable within the mandrel that are moved inwardly through the cylinder by the nose during installation of the fastener.

7. The installation tool of claim 1, wherein the mandrel includes a hollow sleeve on its inner end having means for engaging the spline shaft.

8. The installation tool of claim 7, wherein the first clutch means comprises:

(a) a first clutch housing having its inner end connected to the output shaft for rotation therewith;

(b) said spline shaft in the cylinder having its inner end rotatably received within the outer end of the clutch housing and its outer end threadably connected to the mandrel for limited axial motion upon relative rotation between the spline shaft and the mandrel; and (c) at least one spring in said clutch housing that biases a first ball at one end of the spring radially outwardly into engagement with a notch in the sleeve and biases a second ball at the other end of the spring radially inwardly into rolling engagement with a cylindrical surface on the inner end of the spline shaft.

9. The installation tool of claim 8, wherein the portion of the spline shaft received within the clutch housing also has an annular recess spaced inwardly from the cylindrical surface adapted to receive the second ball of the first clutch means, after the fastener has been swaged.

10. The installation tool of claim 8, wherein the second clutch means comprises:

(a) a second clutch housing slidably connected to an intermediate portion of the spline shaft for rotation therewith;

(b) a nut connected to an outer end of the second clutch housing and a retainer ring connected to an inner end of the second clutch housing;

(c) a first spring biased between the nut and the retainer ring around the second clutch housing;

(d) a plurality of balls retained in a cage at the inner end of the second clutch housing that are biased inwardly by the first spring; and (e) a clutch plate connected to the first clutch housing for rotation therewith, the clutch plate having notches for engaging the balls when the second clutch means is in said engaged position.

11. The installation tool of claim 10, wherein the nut is adjustably connected to the outer end of the second clutch housing for adjusting the compression of the first spring.

12. The installation tool of claim 11, wherein varying the compression of the first spring changes the amount of swaging force that is applied to the fastener by the swaging element.

13. The installation tool of claim 11, wherein a set screw is provided on the nut to secure the nut to the second clutch housing at a desired location.

14. The installation tool of claim 10, wherein a second spring is positioned around the spline shaft to bias the second clutch housing and balls of the second clutch away from the clutch plate.

15. The installation tool of claim 8, wherein the swaging means includes a plurality of pins slidable within the mandrel and which are engaged by the means for moving the swaging means.

16. The installation tool of claim 15, wherein the pins within the mandrel that move the swaging means can be replaced with pins of varied axial length to accommodate different swaging depths for various fasteners.

17. The installation tool of claim 2, wherein the swaging means comprises a split bushing surrounding the shaft on the outer end of the mandrel at a location inwardly from the threaded surface.

18. The installation tool of claim 17, wherein the split bushing has a hexagonal internal surface configuration that matches a hexagonal external surface configuration on the mandrel shaft.

* * * * *